United States Patent [19]
Guelck

[11] Patent Number: 6,042,314
[45] Date of Patent: Mar. 28, 2000

[54] FASTENER AND METHOD OF OPERATION THEREOF FOR INSTALLING A THIN LAYER OF MATERIAL AT AN ADJUSTABLE DISTANCE FROM A SUPPORT

[75] Inventor: Volker Guelck, Waterloo, Canada

[73] Assignee: Windware Inc., Waterloo, Canada

[21] Appl. No.: 08/714,268

[22] Filed: Sep. 17, 1996

[51] Int. Cl.[7] .............................. F16B 35/06; F16B 39/00
[52] U.S. Cl. ..................... 411/399; 411/107; 411/533; 411/999; 411/413; 29/525.11
[58] Field of Search ..................... 411/107, 366, 411/399, 412, 413, 533, 970, 999; 174/53, 57; 29/525.11

[56] References Cited

U.S. PATENT DOCUMENTS

| | | | |
|---|---|---|---|
| 988,743 | 4/1911 | Stillwaggon | 411/107 |
| 2,119,520 | 6/1938 | Brokering | 411/366 |
| 2,353,030 | 7/1944 | Green | 411/999 X |
| 2,470,927 | 5/1949 | Hale, Jr. | 411/999 X |
| 3,390,904 | 7/1968 | Jonelis | 411/999 X |
| 5,433,570 | 7/1995 | Koppel | 411/413 X |
| 5,531,554 | 7/1996 | Jeanson et al. | 411/999 X |

*Primary Examiner*—Neill R. Wilson
*Attorney, Agent, or Firm*—Daryl W. Schnurr

[57] ABSTRACT

A fastener has a screw with an anchor located thereon, the anchor being spaced apart from the head. The anchor has a cut-away portion with a leading edge and a trailing edge of the cut-away portion angling downward. The leading edge angles downward a further distance than the trailing edge. The anchor is spaced apart from the head by a distance corresponding to a thickness of a layer of material to be affixed to a support by an adjustable distance. The layer of material has a small opening therein to accommodate the screw. When the screw is inserted through the opening and into the support, the anchor turns through the opening, even though the opening is smaller than the anchor so that the material is located between the anchor and the head. The screw can then be turned further into the support or further out of the support to adjust the distance between the material and the support in order to align the material as desired.

17 Claims, 5 Drawing Sheets

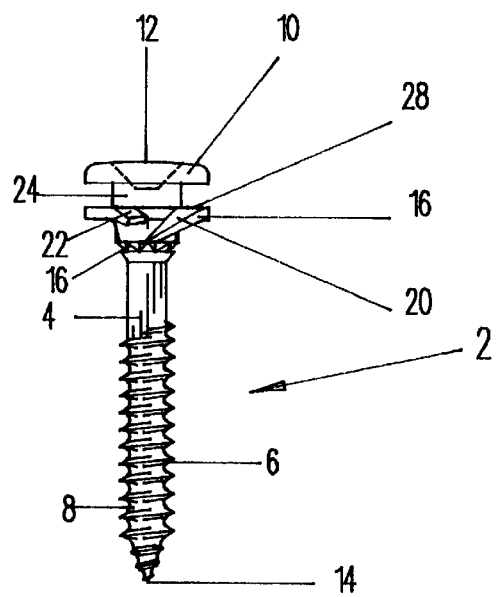

६,०४२,३१४

FASTENER AND METHOD OF OPERATION THEREOF FOR INSTALLING A THIN LAYER OF MATERIAL AT AN ADJUSTABLE DISTANCE FROM A SUPPORT

BACKGROUND OF THE INVENTION

1. Field of the Invention

This invention relates to a fastener for use in installing a thin layer of material at an adjustable distance from a support together with a method of installing the fastener. More particularly, this invention relates to a fastener that can partially pass through a small opening in a thin layer of material and thereafter the distance of the material from a support is adjustable.

2. Description of the Prior Art

Previously, PVC window frames have been adjusted to ensure that the thin layer of PVC material was straight by mounting the PVC material on a support that has previously been straightened. It is common to use shims to straighten a PVC window frame during installation. The use of shims can be extremely time consuming as the frame must be straight as well as solidly anchored to the support.

It is known to fasten a door jamb so that the jamb is adjustable by using a screw that extends through the jamb, then through a screw retaining member that is mounted on the screw after it extends through the jamb and before the screw is mounted in a support. Such an arrangement is described in U.S. Pat. No. 3,859,764 issued on Jan. 14, 1975 and naming Cary as the inventor.

SUMMARY OF THE INVENTION

It is an object of the present invention to provide a fastener that can be used to install a thin layer of material at an adjustable distance from a support by inserting the fastener through a relatively small opening in the thin layer of material so that an anchor on the fastener can be turned through the opening while the fastener is turned into a support.

It is a further object of the present invention to provide a fastener that can be used to adjust a distance of a thin layer of material from a support without installing any additional components on the fastener after the fastener penetrates through the thin layer of material.

A fastener is used to install a thin layer of material at an adjustable distance from a support. The thin layer has an opening therein. The fastener has a screw, which, when in an upright position, has a head at an upper end and a first screw thread at a lower end, with an anchor concentrically located on said screw beneath said head and spaced apart therefrom a distance that is substantially at least equal to a thickness of said thin layer. The anchor has a substantially circular shape with a cut-away portion and a first side of said portion angling downward. The anchor and said head are larger than said opening into said support. The first side of said portion is a leading edge when the screw is turned so that the anchor can be turned through said opening in said layer as the screw turns into said support with the layer ultimately being located between said anchor and said head.

A fastener is used for installing a thin layer of material at an adjustable distance from a support, said thin layer having an opening therein. The fastener has a screw, which, when in an upright position, has a head at an upper end and a first screw thread at a lower end with an anchor concentrically located on said screw beneath said head and spaced apart therefrom by a distance that is substantially at least equal to a thickness of said thin layer. The anchor and said head are larger than said opening. The anchor is shaped to pass through said opening as said screw is turned into said support. The anchor is shaped so that said anchor will not pass through said opening as said screw is turned out of said support. The anchor has a fixed shape which does not change as said anchor passes through said opening. The layer is ultimately located between said anchor and said head.

A method of installing a fastener to adjust a distance of a thin layer of material from a support, said layer having an opening therein, said fastener having a screw which, when in an upright position, has a head at an upper end and a screw thread at a lower end, with an anchor concentrically mounted on said screw beneath said head and spaced apart therefrom by a distance that is substantially equal to a thickness of said layer, said anchor having a substantially circular shape with a cut-away portion with a first side of said portion angling downward, said first side being the leading edge when the screw is turned into said support, said opening being smaller than said anchor and smaller than said head, said method comprising inserting a tip of said screw, with anchor attached, into said opening of said layer of material, turning said screw into said support until said anchor passes through said opening, subsequently further turning said screw into or out of said support and thereby adjusting said distance between said layer and said support.

BRIEF DESCRIPTION OF THE DRAWINGS

FIG. 3 is a side view of a screw having vertical knurls thereon;

FIG. 4 is a side view of the screw of FIG. 3 with an anchor located thereon;

FIG. 6 is a side view of the anchor;

FIG. 7 is a sectional side view of the anchor;

FIG. 8 is a top view of the anchor;

DESCRIPTION OF A PREFERRED EMBODIMENT

Figure 1:
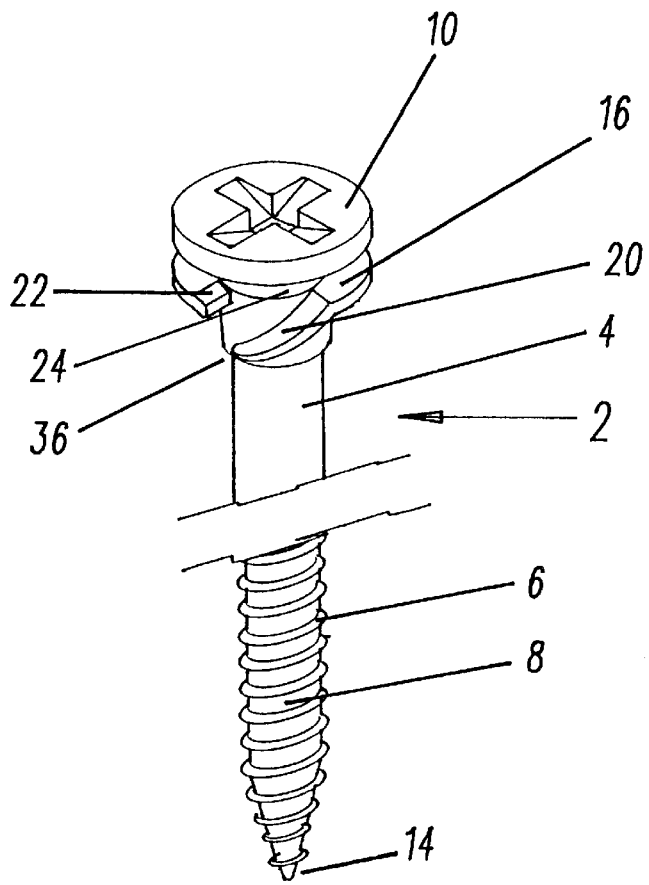
FIG. 1 is a perspective view from above of a fastener.
Figure 2:
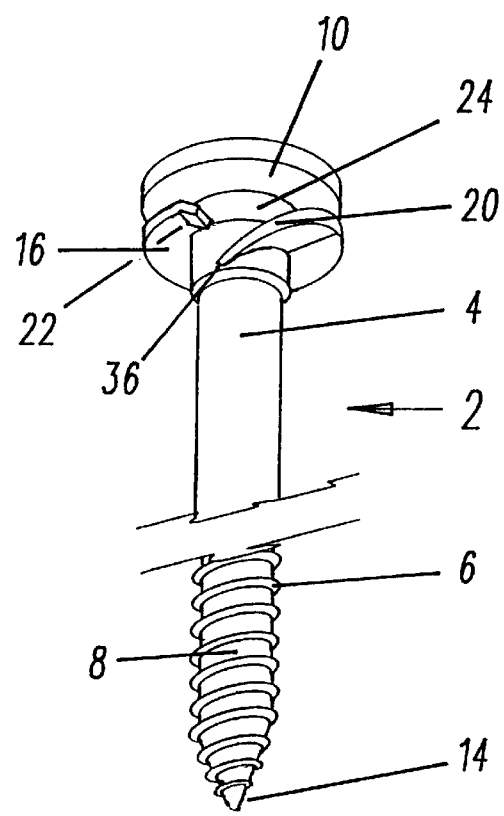
FIG. 2 is a perspective view from below of a fastener.

Referring to FIGS. 1 and 2, a fastener 2 has a screw 4, when in an upright position, having a first screw thread 6 at a lower end 8 and a head 10 at an upper end 12. The screw 4 has a tip 14 with an anchor 16 concentrically mounted on said screw 4 beneath said head 10 and spaced apart from said head by a distance that is substantially equal to a thickness of a thin layer (not shown). The anchor 16 has a substantially circular shape with a cut-away portion 18 (see FIG. 6). A first side 20 of said portion 18 angles downward. The first side is a leading edge when said screw is turned into a support (not shown in FIG. 1). The cut-away portion 18 has a second side 22 that extends downward as well, the first side 20 extending downward a greater distance than said second side. The anchor 16 shown in FIGS. 1 and 2 can be integral with the screw 4 or it can be mounted on the screw 4 in various ways. For example, the anchor can be welded onto the screw.

Throughout the drawings, those components that are the same or similar to the components in previous drawings will be referred to using the same reference numerals.

In FIGS. 3 and 4, the screw 4 has an abutment 24 located beneath said head 10 to maintain a distance between said head 10 and anchor 16. A plurality of vertically aligned knurls 26 are located between said first screw thread 6 and said head 10 beneath said abutment 24. The anchor 16 is sized to turn onto said knurls 26 with an upper surface 28 of said anchor contacting said abutment 24.

Preferably, the screw 4 and the anchor 16 are both made from steel but the screw is heat tempered so that it is harder than the anchor. When the anchor is turned onto the knurls, the knurls cut into the anchor to hold it in position.

Figures 5, 13:
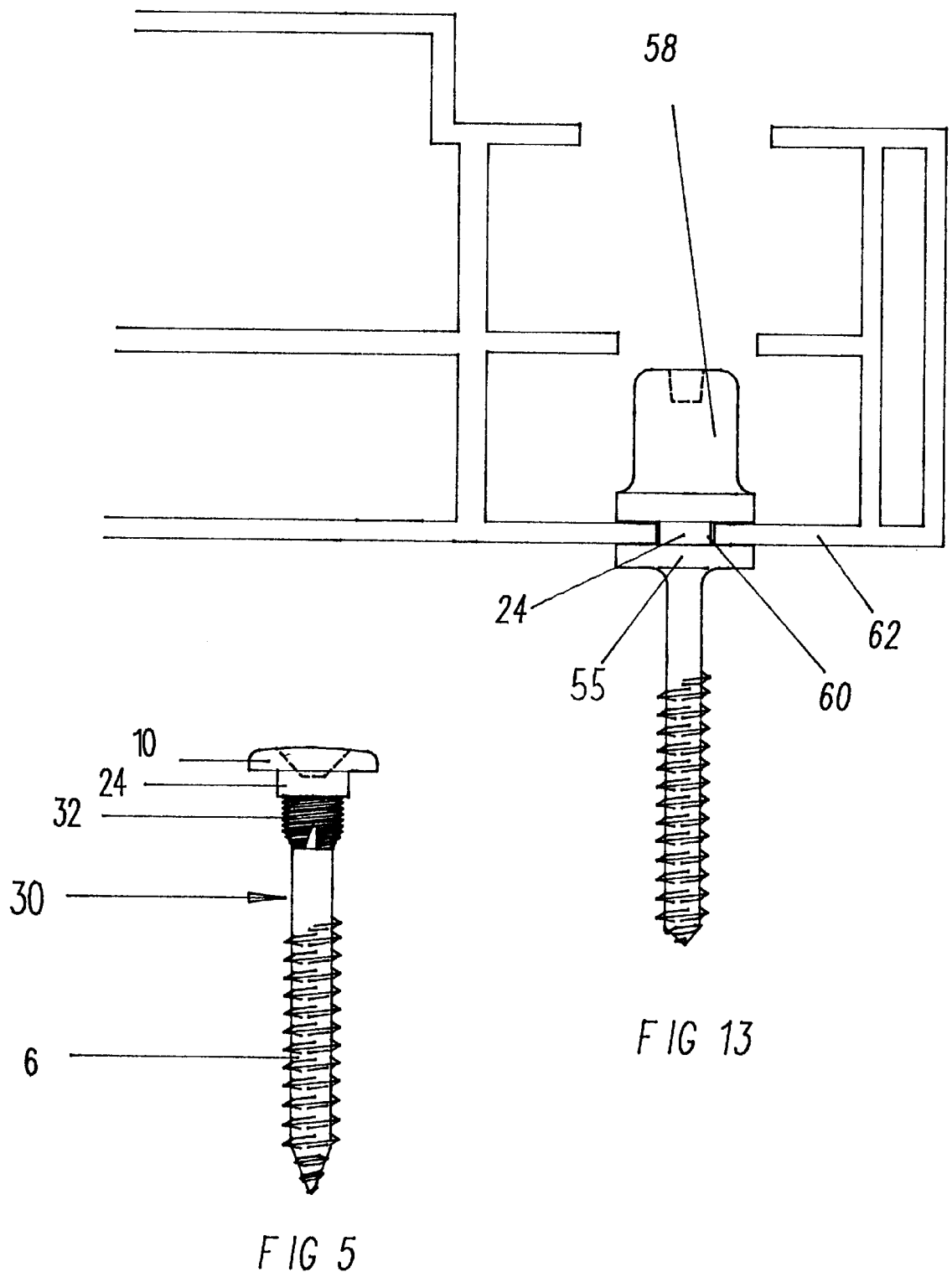
FIG. 5 is a side view of the screw having a first screw thread and a second screw thread thereon.
FIG. 13 is a side view of the fastener of FIG. 12 extending through an opening in a thin layer of material.

In FIG. 5, there is shown a screw 30 where the knurls 26 have been replaced by a second screw thread 32 located between the first screw thread 6 and the head 10 beneath the abutment 24. The screw 30 is preferably hardened so that the second screw thread 32 will cut threads into a central portion 34 of the anchor 16. The anchor 16 is turned onto the second screw thread 32 until the upper surface 28 contacts the abutment 24.

From FIGS. 6, 7 and 8, it can be seen that a leading edge 36 of the first side 20 of the cut-away portion 18 commences substantially at an interior of said anchor 16, which is adjacent to said screw when the anchor is mounted on said screw. An opening (not shown) in the thin layer (not shown in FIG. 7) of material is large enough so that the edge of the opening extends radially slightly beyond the leading edge 36.

Figure 9:
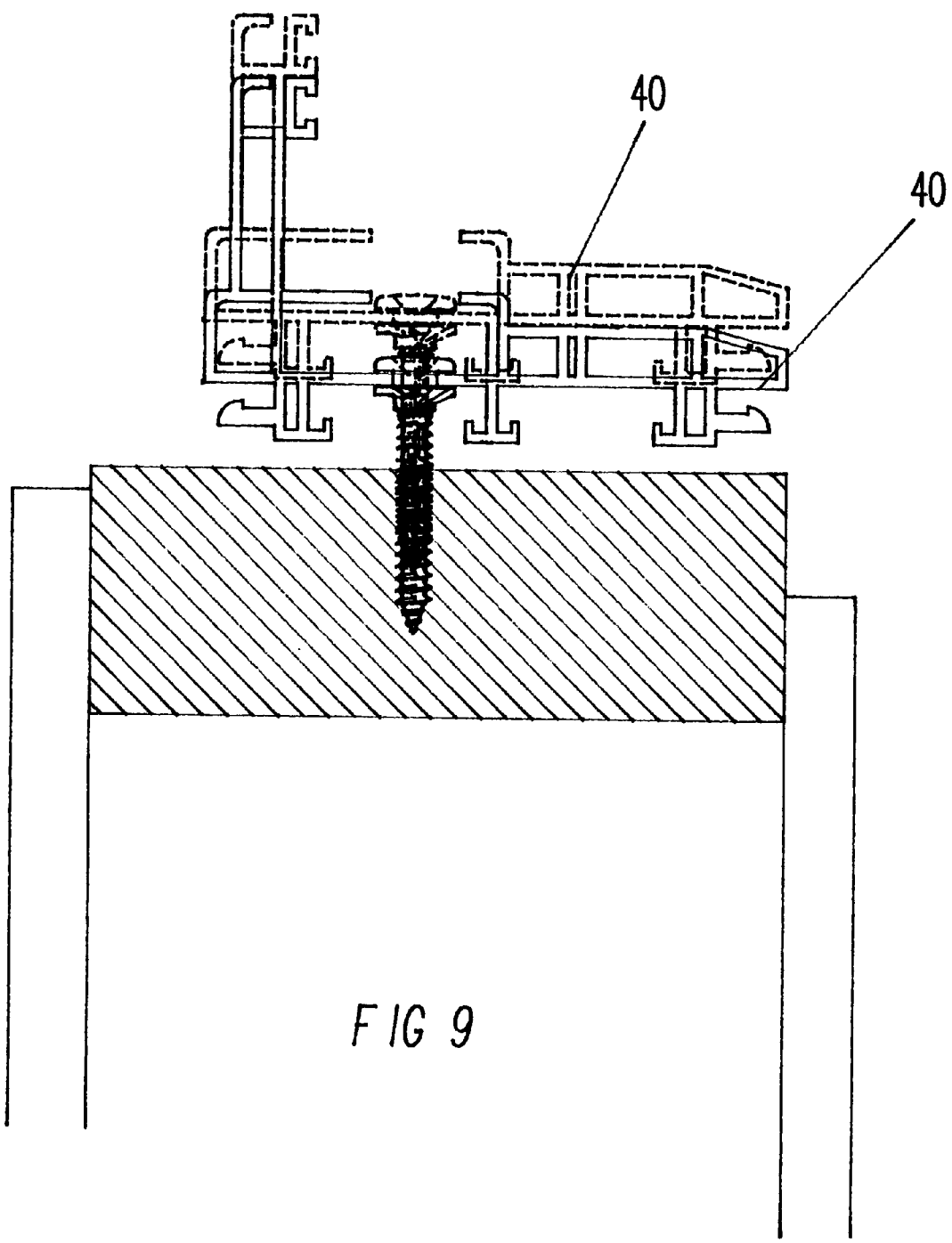
FIG. 9 is a partial sectional side view of a fastener penetrating a support and holding a PVC window frame an adjustable distance from the support.

In FIG. 9, the first screw thread 6 of the fastener 2 is mounted in a support 38, preferably made of wood. A PVC window frame 40 is the thin layer of material. After the fastener 2 is turned through an opening 42 in the frame 40, the anchor 16 is on one side of the frame 40 and the head 10 is on the opposite side. The anchor can be turned through the opening 42 without tearing the opening. The dotted lines of the frame 40 shown closer to the support 38 in FIG. 8 show the movement of the frame 40 as the screw is turned further into the support 38. The dotted lines of the frame 40 that are further away from the support show the movement of the frame 40 as the screw 4 is turned out of the support 38, thereby moving the frame further away from the support 38. Typically, a window frame will have two fasteners, one mounted near a top of the frame and one mounted near a bottom of the frame. The two fasteners can be adjusted inward or outward until the frame is held in a perpendicular position. With large frames more than two fasteners can be required.

Figure 10:
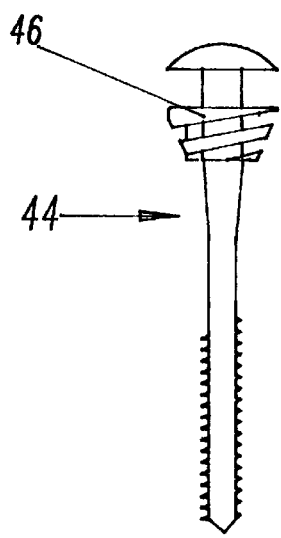
FIG. 10 is a side view of a further embodiment of a fastener having a helical anchor.
Figure 11:
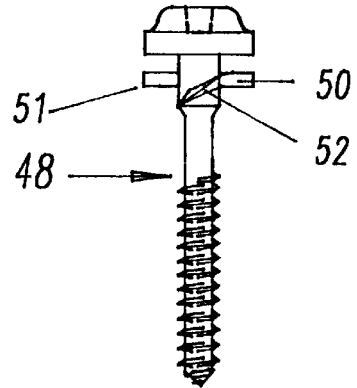
FIG. 11 is a further embodiment of a fastener where only one side of a cut-away portion extends downward.
Figure 12:
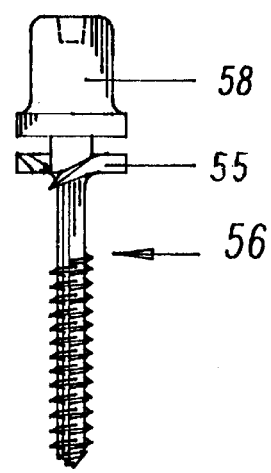
FIG. 12 is a side view of a further embodiment of a fastener with an enlarged head.

In FIG. 10, a fastener 44 has an anchor 46 that differs from the anchor 16 in that the anchor 46 has a helical shape that tapers inward from top to bottom of said anchor. The anchor 46 will be much more expensive to manufacture than the anchor 16 and is therefore not as desirable. In FIG. 11, a fastener 48 has an anchor 50 that has only one side 52 of the cut-away portion angling downward. Another side 54 is flat. In FIG. 12, an anchor 55 of a fastener 56 is the same shape as the anchor 16 but the fastener 56 has an enlarged head 58. Also, the anchor 55 is an integral part of the fastener 56. In FIG. 13, the fastener 56 is shown installed through an opening 60 in a thin layer of PVC window frame material 62 with the anchor 55 on one side of the layer 62 and the head 58 on the other side. The support is not shown in FIG. 13. It can be seen that the opening 60 is slightly larger than a diameter of the abutment 24.

What I claim as my invention is:

1. A fastener for use in installing a thin layer of material at an adjustable distance from a support, said thin layer having an opening therein, said fastener comprising a screw, which, when in an upright position, has a head at an upper end and a first screw thread at a lower end, with an anchor concentrically located on said screw beneath said head and spaced apart therefrom a distance that is substantially at least equal to a thickness of said thin layer, said anchor having a substantially circular shape with a cut-away portion, and a first side of said portion angling downward, said anchor and said head each being larger than said opening, said first side being a leading edge when the screw is turned so that the anchor can be turned through said opening in said layer as the screw turns into said support with the layer ultimately being located between said anchor and said head.

2. A fastener as claimed in claim 1 wherein the anchor is mounted on the screw.

3. A fastener as claimed in claim 2 wherein the anchor is removably mounted on said screw.

4. A fastener as claimed in claim 2 wherein said cut-away portion has a second side, said second side extending downward as well, said first side extending downward a greater distance than said second side.

5. A fastener as claimed in claim 4 wherein said screw has an abutment beneath said head to maintain said distance between said head and said anchor, a second screw thread located between said first screw thread and said head, said second screw thread extending beneath said abutment, said anchor being sized to turn on said second screw thread with an upper surface of said anchor contacting said abutment.

6. A fastener as claimed in claim 4 wherein said screw has an abutment beneath said head to maintain said distance between said head and said anchor, a plurality of knurls located between said first screw thread and said head, said knurls extending beneath an abutment, said anchor being sized to turn on said knurls with an upper surface of said anchor contacting said abutment.

7. A fastener as claimed in claim 6 wherein said knurls are vertically aligned around said screw, said knurls cutting into said anchor when said anchor is turned onto said knurls to contact said abutment.

8. A fastener as claimed in any one of claims 1, 5 or 6 wherein said leading edge commences substantially at an interior of said anchor adjacent said screw.

9. A fastener as claimed in any one of claims 1, 5 or 6 wherein said anchor has a flat upper surface except for said cut-away portion.

10. A fastener as claimed in any one of claims 1, 5 or 6 wherein said distance is larger than a thickness of said thin layer.

11. A fastener for use in installing a thin layer of material at an adjustable distance from a support, said thin layer having an opening therein, said fastener comprising a screw, which, when in an upright position, has a head at an upper end and a first screw thread at a lower end with an anchor concentrically located on said screw beneath said head and spaced apart therefrom by a distance that is substantially at least equal to a thickness of said thin layer, said anchor and said head each being larger than said opening, said anchor being shaped to pass through said opening as said screw is turned into said support, said anchor being shaped so that said anchor will not pass through said opening as said screw is turned out of said support, said anchor having a fixed shaped that does not change when said anchor passes through said opening, said layer ultimately being located between said anchor and said head.

12. A fastener as claimed in claim 11 wherein the anchor has a helical shape.

13. A fastener as claimed in claim 12 wherein the anchor has a flat upper surface.

14. A fastener as claimed in claim 11 wherein the anchor has a substantially circular shape with a cut-away portion, with a first side of said portion angling downward, said first side being a leading edge when the screw is turned into said support.

15. A fastener as claimed in any one of claims 1, 11 or 12 wherein the anchor and screw are integral with one another.

16. A method of installing a fastener to adjust a distance of a thin layer of material from a support, said layer having an opening therein, said fastener having a screw which, when in an upright position, has a head at an upper end and a screw thread at a lower end, with an anchor concentrically mounted on said screw thread beneath said head and spaced apart therefrom by the distance that is substantially equal to a thickness of said layer, said anchor having a substantially circular shape with a cut-away portion with a first side of said portion angling downward, said first side being the leading edge when the screw is turned into said support, said opening being smaller than said anchor and smaller than said head, said method comprising inserting a tip of said screw, with anchor attached, into said opening of said layer of material, turning said screw into said support until said anchor passes through said opening, subsequently further turning said screw into or out of said support and thereby adjusting said distance between said layer and said support.

17. A method of installing a fastener to adjust a distance of a thin layer of material from a support, said layer having an opening therein, said fastener having a screw which, when in an upright position, has a head at an upper end and a screw thread at a lower end, with an anchor concentrically mounted on said screw thread beneath said head and spaced apart therefrom by the distance that is substantially equal to a thickness of said layer, said anchor having a substantially circular shape with a cut-away portion with a first side of said portion angling downward, said first side being the leading edge when the screw is turned into said support, said opening being substantially smaller than said anchor and substantially smaller than said head, said method comprising inserting a tip of said screw, with anchor attached, into said opening of said layer of material, turning said screw into said support until said anchor passes through said opening, subsequently further turning said screw into or out of said support and thereby adjusting said distance between said layer and said support.

* * * * *